United States Patent
Koyama et al.

(10) Patent No.: US 7,060,758 B2
(45) Date of Patent: Jun. 13, 2006

(54) POLYISOCYANATE COMPOUND, PROCESS FOR PRODUCING THE COMPOUND, POLYADDITION COMPOSITION AND POWDER COATING MATERIAL

(75) Inventors: Takeshi Koyama, Kanagawa (JP); Takeshi Nomura, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 35 days.

(21) Appl. No.: 10/765,167

(22) Filed: Jan. 28, 2004

(65) Prior Publication Data
US 2004/0185264 A1 Sep. 23, 2004

(30) Foreign Application Priority Data
Jan. 28, 2003 (JP) ............................. 2003-019244

(51) Int. Cl.
*C08G 18/42* (2006.01)
(52) U.S. Cl. ........................................ 525/440; 528/73
(58) Field of Classification Search .................. 528/73; 525/440
See application file for complete search history.

(56) References Cited

U.S. PATENT DOCUMENTS

| 4,413,079 A | 11/1983 | Disteldorf et al. |
| 4,476,054 A | 10/1984 | Disteldorf et al. |
| 5,315,004 A * | 5/1994 | Goldstein et al. ............ 540/202 |
| 5,596,066 A * | 1/1997 | Laas et al. ..................... 528/73 |
| 5,814,689 A | 9/1998 | Goldstein et al. |

FOREIGN PATENT DOCUMENTS

| DE | 198 04 280 | 8/1999 |
| JP | 10162563 | * 10/1999 |

OTHER PUBLICATIONS

Communication and European Search Report mailed May 28, 2004, for EP No. 04 00 1643.

* cited by examiner

*Primary Examiner*—Rachel Gorr
(74) *Attorney, Agent, or Firm*—Antonelli, Terry, Stout and Kraus, LLP.

(57) ABSTRACT

A polyisocyanate compound obtained by highly converting a bis(isocyanatomethyl)cyclohexane into a uretidione compound, a process for producing the compound, a polyisocyanate polyaddition composition obtained by polyaddition of the compound, a compound having at least two hydroxyl groups and a compound having one hydroxyl group, and a powder coating material using the composition as the curing agent. The powder coating material is advantageous for safety and health due to the absence of dissociation of blocking agents and for economy due to a content of latent NCO greater than conventional uretidione-based powder coating materials. When a curing agent obtained from the polyisocyanate compound is used in combination with a polyester polyol having 30% or greater of hydroxyl group bonded to secondary carbon atom in the entire hydroxyl group, the curing temperature is lowered and the coating film exhibits excellent gloss like solvent-based coating materials, smoothness of the surface, weatherability and mechanical properties.

4 Claims, No Drawings

POLYISOCYANATE COMPOUND, PROCESS FOR PRODUCING THE COMPOUND, POLYADDITION COMPOSITION AND POWDER COATING MATERIAL

BACKGROUND OF THE INVENTION

1. Field of the Invention

The present invention relates to a polyisocyanate compound having a uretidione skeleton structure, a process for producing the compound and a polyisocyanate polyaddition composition comprising the compound. Since the uretidione skeleton structure of the polyaddition composition releases an isocyanate by heating, the composition is useful as the material for the curing agent for polyurethane-based thermosetting resins and can be advantageously used for powder coating materials.

2. Description of the Related Arts

It is the general situation at present that coating materials based on organic solvents are being replaced with coating materials which do not use organic solvents such as aqueous coating materials and powder coating materials due to the problems on safety and health. By the use of the powder coating materials, the environmental pollution can be decreased since the powder coating materials can be recovered and reused, and improvements in the physical properties can be expected since the powder coating materials can form thick coating films. In particular, polyurethane-based powder coating materials exhibit excellent weatherability and physical properties of the coating films and are expected to replace the coating materials based on organic solvents. The polyurethane powder coating materials are useful as the coating materials for electric appliances, building materials, automobile members, office furnitures and members of electric instruments. Precoat metals coated with the polyurethane powder coating materials can be used for electric appliances, building materials, road construction materials, automobile members, automobiles bodies, office furnitures and members of electric instruments.

As the polyurethane coating material, coating materials which use polyester polyols as the main component and curing agents obtained by blocking isocyanate group in isophorone diisocyanate (referred to as IPDI, hereinafter), which is an alicyclic diisocyanate, with a blocking agent such as ε-caprolactam are mainly used (Japanese Patent Application Publication No. Heisei 3(1991)-31744).

However, since crosslinking of the polyol is achieved by dissociation of the blocking agent during baking of the coating film in accordance with the process using the above materials, the discharged ε-caprolactam adversely affects the human health, and contamination of the oven takes place. To overcome the above problems, processes and materials which do not use blocking agents and utilize the uretidione skeleton structure such as a process for producing a uretidione compound using IPDI (Japanese Patent Application Publication No. Heisei 3(1991)-80790), a process for producing a polyaddition composition having the uretidione skeleton structure (Japanese Patent Application Publication No. Showa 64(1989)-11052) and a powder coating material using this polyaddition composition as the curing agent (Japanese Patent Application Publication No. Showa 64(1989)-5627) have been disclosed. The uretidione skeleton structure is formed by dimerization of isocyanate group and, in general, the uretidione skeleton structure and a polyol do not react with each other. Compounds having the uretidione skeleton structure are useful as the curing agent in powder coating materials since, when the coating film is heated during baking, the uretidione skeleton structure is dissociated to form two isocyanate groups, and the formed isocyanate group can react with the polyol. Since the content of the uretidione skeleton structure provides the content of NCO group during baking of the coating film, this content is defined as the content of the latent NCO group, which will be described more specifically later.

IPDI provides coating films exhibiting more excellent weatherability than that obtained by using aromatic isocyanates since IPDI is an alicyclic isocyanate. However, the curing agent based on the uretidione compound of IPDI cannot satisfy the requirements of the market due to drawbacks such that the formed powder coating film has a problem on smoothness of the surface due to a great viscosity, and that the dissociation temperature is high due to the chemical structure having asymmetric isocyanate groups, and the gel fraction cannot be sufficiently increased, resulting in insufficient mechanical properties of the coating film such as insufficient impact strength. To overcome the drawbacks of the curing agent based on the uretidione compound of IPDI, a polyester polyol or a polycarbonate polyol is used as the diol used for producing the polyaddition composition (Japanese Patent Application Laid-Open No. Heisei 7(1995)-82339). However, this process is economically disadvantageous since the content of the latent NCO group decreases, and the amount of the added curing agent increases. A polyisocyanate composition having a uretidione skeleton structure which uses hexamethylene diisocyanate (referred to as HDI, hereinafter), which is an aliphatic diisocyanate, as the material exhibits poor resistance to blocking and is not suitable for the powder coating material. A uretidione curing agent using a bis(isocyanatomethyl)cyclohexane and not using blocking agents has been disclosed (Japanese Patent Application Laid-Open No. Heisei 10(1998)-182787). However, this curing agent has a great isocyanurate fraction [the content of the isocyanurate skeleton structure×100/(the content of the isocyanurate skeleton structure+the content of the uretidione structure)] and a small content of the uretidione skeleton structure. The cost increases due to the increased amount of the curing agent, and the above agent is unsatisfactory as the curing agent.

The present invention has an object of providing a polyisocyanate compound which overcomes the drawbacks of conventional polyisocyanate compounds having the uretidione skeleton structure and polyaddition compositions containing the conventional polyisocyanate compounds, a process for producing the polyisocyanate compound and a polyisocyanate polyaddition composition. In other words, the present invention has an object of providing a polyisocyanate polyaddition composition which forms a coating film exhibiting excellent smoothness of the surface, weatherability and mechanical properties when the composition is used as the curing agent for powder coating materials.

SUMMARY OF THE INVENTION

As the result of intensive studies by the present inventors to overcome the above problems, it was found that the problems found heretofore were entirely overcome when a polyisocyanate polyaddition composition, which was obtained by polyaddition of a polyisocyanate compound having a uretidione skeleton structure obtained from a bis(isocyanatomethyl)cyclohexane with a compound having at least two active hydrogen atoms in one molecule and a compound having one active hydrogen atom in one molecule, was used as the curing agent. The present invention has been completed based on this knowledge.

The present invention provides:
(1) A polyisocyanate compound obtained by converting a bis(isocyanatomethyl)cyclohexane into a uretidione compound, the polyisocyanate compound having a content of a latent NCO group [(a content of free NCO group after a heat treatment at 180° C. for 1 hour)−(a content of free NCO group before the heat treatment)] of 16 to 30% by weight and an isocyanurate fraction [a content of an isocyanurate skeleton structure×100/(a content of an isocyanurate skeleton structure+a content of a uretidione structure)] smaller than 5% by weight;
(2) A process for producing a polyisocyanate compound described in (1) which comprises converting a bis(isocyanatomethyl)cyclohexane into a uretidione compound at a temperature in a range of −10 to 80° C. in a presence of a catalyst for forming a uretidione compound and removing the unreacted bis(isocyanatomethyl)cyclohexane and the catalyst by distillation;
(3) A polyisocyanate polyaddition composition which is obtained by reacting (A) a polyisocyanate compound described in (1) and (B) a compound having active hydrogen atom, which comprises a combination of (a) a compound having at least two active hydrogen atoms in one molecule and (b) a compound having one active hydrogen atom in one molecule in amounts such that a ratio of an amount by equivalent of active hydrogen atom in component (a) to an amount by equivalent of active hydrogen atom in component (b) is in a range of 1 to 99, in a manner such that a ratio of an amount by equivalent of active hydrogen atom in component (B) to an amount by equivalent of isocyanate group in component (A) (a ratio of amounts by equivalent of active hydrogen atom/isocyanate group) is in a range of 1.0 to 2.0; and
(4) A powder coating material which comprises at least one main material selected from polyester polyols, acrylic polyols and fluorinated polyols and a curing agent comprising a polyisocyanate polyaddition composition described in (3).

DESCRIPTION OF THE PREFERRED EMBODIMENTS

The polyisocyanate compound of the present invention is a compound obtained by converting a bis(isocyanatomethyl)cyclohexane into a uretidione compound and has a content of the latent NCO group [(the content of the free NCO group after the heat treatment at 180° C. for 1 hour)−(the content of the free NCO group before the heat treatment)] of 16 to 30% by weight and an isocyanurate fraction [content of isocyanurate skeleton structure×100/(the content of the isocyanurate skeleton structure+the content of the uretidione structure)] smaller than 5% by weight. The concentration of the residual monomer (bis(isocyanatomethyl)cyclohexane) is, in general, 5% by weight or smaller. The analysis of the compound can be conducted in accordance with the gel permeation chromatography (referred to as GPC, hereinafter) and the infrared spectrophotometry. The concentration of the residual monomer is obtained from the ratio of areas in the gel chromatogram using a calibration curve. When the concentration of the residual monomer exceeds 5% by weight, the content of the latent NCO group is small, and the compound is economically disadvantageous. The content of the latent NCO group used in the present invention is a value obtained by heating a polyisocyanate compound obtained by the conversion into a uretidione compound at 180° C. for 1 hour, followed by subtracting the content of the free NCO group before the heat treatment from the content of the free NCO group after the heat treatment at 180° C. for 1 hour. The content of the free NCO group is obtained by titration. When the content of the free NCO group is smaller than 16% by weight, the amount of the added curing agent increases, and the compound is economically disadvantageous. When the content of the latent NCO group exceeds 30% by weight, viscosity increases, and the production of the polyaddition composition becomes difficult. The isocyanurate fraction can be obtained in accordance with the equation: the isocyanurate fraction=the content of the isocyanurate skeleton structure×100/(the content of the isocyanurate skeleton structure+the content of the uretidione structure), based on the absorbances of light assigned to the isocyanurate skeleton structure and the uretidione skeleton structure obtained in accordance with the infrared spectrophotometry. When the isocyanurate fraction exceeds 5% by weight, viscosity increases, and gel is formed in the production of the polyaddition composition.

Examples of the bis(isocyanatomethyl)cyclohexane used in the present invention include 1,3-bis(isocyanatomethyl)cyclohexane and 1,4-bis(isocyanatomethyl)cyclohexane. A mixture of these compounds can also be used.

The production of the polyisocyanate compound of the present invention is conducted as follows. Solvents are used or not used for the reaction system. When a solvent is used, a solvent which is not reactive to isocyanate group must be selected. A uretidione compound is formed by adding a catalyst for the formation of a uretidione compound to the bis(isocyanatomethyl)cyclohexane or the bis(isocyanatomethyl)-cyclohexane and the solvent. The reaction can be traced by GPC, the infrared spectrophotometry or the measurement of the refractive index. The temperature of the reaction to obtain the polyisocyanate compound of the present invention is in the range of −10 to 80° C. When the temperature is lower than −10° C., the reaction is slow. The reaction time markedly increases, and the amount of the catalyst for the formation of a uretidione compound increases. Therefore, the temperature is not suitable from the standpoint of economy. When the temperature exceeds 80° C., the reaction product is colored, and side reactions take place. Therefore, a temperature outside the above range is not preferable. Subsequently, the unreacted bis(isocyanatomethyl)cyclohexane, the catalyst for the formation of a uretidione compound and/or the solvent is removed in accordance with the thin film evaporation so that the polyisocyanate compound is separated from the reaction fluid. In this procedure, it is preferable that the unreacted bis(isocyanatomethyl)-cyclohexane and the catalyst for the formation of a uretidione compound are recovered simultaneously. The unreacted bis(isocyanatomethyl)-cyclohexane and the catalyst for the formation of a uretidione compound recovered by the distillation can be reused for the reaction.

The catalyst for the formation of a uretidione compound used in the present invention is a catalyst for preferentially forming the uretidione skeleton structure from two molecules of a bis(isocyanatomethyl)cyclohexane. Examples of the catalyst include trivalent phosphorus compounds such as tris(dimethylamino)phosphine, tris(diethylamino)phosphine, triethylphosphine, tri-n-propylphosphine, triisopropylphosphine, tri-n-butylphosphine, triisobutylphosphine, tri-tert-butylphosphine, tri-n-hexylphosphine, tricyclohexylphosphine, tri-n-octylphosphine, tribenzylphosphine and benzyldimethylphosphine; and Lewis acids such as boron trifluoride and zinc dichloride. Among these compounds, tris(dialkylamino)phosphines having aliphatic groups having 1 to 6 carbon atoms and alicyclic alkyl groups are preferable. Specific examples of the tris(dialkylamino)phosphine include tris(dimethylamino)phosphine, tris(diethylamino)phosphine and tris(dicyclohexylamino)phosphine. The above compounds are used singly or in combination of two or more in an amount in the range of 0.01 to 10% by weight and preferably in the range of 0.1 to 2% by weight based on the amount of the bis(isocyanatomethyl)cyclohexane.

The polyisocyanate polyaddition composition is a composition which is obtained by reacting (A) a polyisocyanate compound described in (1) and a (B) compound having active hydrogen atom which comprises a combination of (a) a compound having at least two active hydrogen atoms in one molecule and (b) a compound having one active hydrogen atom in one molecule in amounts such that the ratio of the amount by equivalent of active hydrogen atom in component (a) to the amount by equivalent of active hydrogen atom in component (b) is in the range of 1 to 99. The reaction is conducted in a manner such that the ratio of the amount by equivalent of active hydrogen atom in component (B) to the amount by equivalent of isocyanate group in component (A) (the ratio of the amounts by equivalent of active hydrogen atom/isocyanate group) is in a range of 1.0 to 2.0.

Examples of the compound having at least two active hydrogen atoms in one molecule of component (a) of component (B) used in the present invention include aliphatic, alicyclic and aromatic diols and diamines. Specific examples of the above compound include ethylene glycol, ethylenediamine, 1,3-propanediol, 1,2-propanediol, 2-methyl-1,3-propanediol, 1,4-butanediol, 1,3-butanediol, 1,4-pentanediol, 1,5-pentanediol, 1,6-hexanediol, 1,6-hexanediamine, 1,5-hexanediol, 1,2-hexanediol, 2,5-hexanediol, octanediols, nonanediols, decanediols, diethylene glycol, 1,4-bis(hydroxymethyl)cyclohexane, triethylene glycol, dipropylene glycol, cyclohexanediol, phenylhydroquinone, dihydroxy-naphthalene and hydroquinone. The above compound may be used singly or in combination of two or more. Triols such as trimethylolpropane and tetraols such as pentaerythritol may be added. However, the reaction of a polyol having a functionality of three or greater and a polyisocyanate forms gel. Therefore, when a polyol having a functionality of three or greater is added, it is preferable that the polyol is used as a mixture with the above diols in an amount of 5% by weight or less based on the amount of the compound having at least two active hydrogen atoms of component (a). When the amount exceeds 5% by weight, there is the possibility that a great amount of gel is formed in the production of the polyaddition composition.

Examples of the compound having one active hydrogen atom in one molecule of component (b) of component (B) used in the present invention include aliphatic, alicyclic and aromatic monools, monoamines, lactams and oximes such as ethanol, propanol, butanol, pentanol, hexanol, 2-ethylhexanol, heptanol, nonyl alcohol, cyclobutanol, cyclohexanol, phenol, benzyl alcohol, aminopropane, aminobutane, aminopentane, aminohexane, aminooctane, ε-caprolactam, γ-valerolactam, formaldoxime, methyl ethyl ketoxime and cyclohexanone oxime.

The polyisocyanate compound of component (A), the compound having at least two active hydrogen atoms of component (a) of component (B) and the compound having one active hydrogen atom of component (b) of component (B) are used in amounts such that the ratio of the amount by equivalent of active hydrogen atom to the amount by equivalent of isocyanate group in the polyisocyanate compound (the active hydrogen atom/isocyanate group ratio by equivalent) is in the range of 1.0 to 2.0. When the ratio of the amount by equivalent of active hydrogen atom to the amount by equivalent of isocyanate group in the polyisocyanate compound exceeds 2.0, the content of the latent NCO group decreases, and the weatherability and mechanical properties cannot satisfy the requirements. When the ratio is smaller than 1.0, a great amount of isocyanate group is bonded to the end structures of the uretidione compound. The melt fluidity during the baking deteriorates due to the crosslinking taking place during melt mixing with the compound having active hydrogen atom by an extruder or a kneader, and the smoothness of the surface of the obtained coating film becomes poor. The ratio of the amount by equivalent of the compound having at least two active hydrogen atoms of component (a) to the amount by equivalent of the compound having one active hydrogen atom of component (b) is in the range of 1 to 99. When the ratio of the amount by equivalent of component (a) to the amount by equivalent of component (b) is smaller than 1, the degree of polymerization decreases, and the glass transition temperature of the polyaddition composition becomes lower than the room temperature. Therefore, the blocking, i.e., the phenomenon in which powder of the coating material is formed into blocks, tends to take place when the polyaddition composition is used as the curing agent for a powder coating material. When the ratio of the amount by equivalent of component (a) to the amount by equivalent of component (b) exceeds 99, viscosity of the polyaddition composition increases, and the production of the polyaddition composition becomes difficult. Moreover, the property of the surface obtained by using the composition becomes poor.

In the production of the polyaddition composition used in the present invention, the compound having at least two active hydrogen atoms of component (a) of component (B) and the compound having one active hydrogen atom of component (b) of component (B) may be added to the polyisocyanate compound having the uretidione skeleton structure of component (A) separately or after mixing components (a) and (b). To prevent a rapid increase in the temperature due to the heat of reaction, it is preferable that components (a) and (b) are added in small portions continuously or intermittently. When components (a) and (b) are added separately, the order of the addition is not restricted. When the temperature of the addition is lower than 60° C., the reaction is slow. When the temperature exceeds 150° C., reactions other than the reaction for the formation of a uretidione take place, and gel is occasionally formed. Therefore, a temperature of the addition outside the range of 60 to 150° C. is not preferable. A catalyst for the formation of urethane such as an organotin-based tin catalyst may be used in combination in the reaction.

The content of the latent NCO group in the polyaddition composition of the present invention is, in general, in the range of 15 to 25% by weight and preferably in the range of 16 to 20% by weight. When the content of the latent NCO group is smaller than 15% by weight, the amount of the added curing agent increases, and the composition is economically disadvantageous. When the content exceeds 25% by weight, the production of the polyaddition composition becomes difficult due the difficulty in the synthesis.

The weight-average molecular weight of the polyaddition composition of the present invention is in the range of about 2,000 to 20,000 and preferably in the range of 2,000 to 15,000. When the weight-average molecular weight is smaller than 2,000, the content of the latent NCO group taking part in the crosslinking decreases due to the increase in the amount of the end group. It is necessary for taking part in the crosslinking that, when the uretidione skeleton structure is dissociated, the two end portions formed by the ring-opening each become isocyanate group. However, the gel fraction does not increase when the amount of the end group which does not react with the main component is excessively great. When the weight-average molecular weight exceeds 20,000, the melt viscosity increases during the baking of the coating material prepared by melt mixing the composition with the main component and pulverizing the obtained mixture, and the smoothness of the surface of the coating film becomes poor. Therefore, a weight-average molecular weight outside the above range is not preferable.

The glass transition temperature of the polyaddition composition used in the present invention is in the range of about 40 to 140° C. and preferably in the range of 50 to 130° C. When the glass transition temperature is lower than 40° C., the blocking, i.e., the phenomenon in which powder particles of the coating material stick together and are formed into blocks, tends to take place during storage in the summer time in a powder coating material prepared by melt mixing the composition with the polyol and pulverizing the obtained mixture. When the glass transition temperature exceeds 140° C., the ring-opening of the uretidione skeleton structure takes place during the mixing by an extruder or a kneader with the main material which requires a temperature of working by heat melting higher than this temperature, and crosslinking takes place by the reaction of isocyanate group and hydroxyl group. The torque of the mixing machine markedly increases, and the operation becomes difficult. Therefore, a glass transition temperature outside the above range is not preferable.

The powder coating material of the present invention comprises at least one compound selected from polyester polyols, acrylic polyols and fluorinated polyols as the main material and the polyaddition composition described above as the curing agent. The main material used in the present invention is at least one material selected from polyester polyols, acrylic polyols and fluorinated polyols, which has a hydroxyl value of about 20 to 300 mg KOH/g, is solid at the room temperature and preferably has an acid value of 10 mg KOH/g or greater, a glass transition temperature of 40 to 80° C. and a weight-average molecular weight of 5,000 to 30,000. The powder coating material of the present invention has an NCO equivalent, which is obtained from the content of the latent NCO group in the polyaddition composition, preferably in the range of 0.7 to 1.5 equivalents per 1 equivalent of the polyol. When the amount of the polyaddition composition expressed by the above content is less than 0.7 equivalents, the crosslinking reaction is insufficient, and weatherability and mechanical properties of the coating film are poor. When the amount exceeds 1.5 equivalents, the mechanical properties of the coating film deteriorate, and the cost of the coating material increases due to the excess amount of the crosslinking agent left remaining.

Examples of the polyester polyol used in the present invention include polyester polyol resins obtained by the condensation of dibasic acids selected from the group consisting of carboxylic acids, such as succinic acid, adipic acid, sebacic acid, dimer acid, maleic anhydride, fumaric anhydride, isophthalic acid and terephthalic acid, used singly or as a mixture of two or more, with polyhydric alcohols selected from the group consisting of polyhydric alcohols, such as ethylene glycol, propylene glycol, diethylene glycol, butylene glycol, neopentyl glycol, trimethylol-propane and glycerol, used singly or as a mixture of two or more; polycaprolactones obtained by the ring-opening polymerization of ε-caprolactone with polyhydric alcohols; and esters of aliphatic carboxylic acids having hydroxyl group and polyhydric alcohols, typical examples of which include castor oil.

In the polyester polyol used in the present invention, for improving the properties of the surface formed with the powder coating material, it is preferable that the fraction of hydroxyl group bonded to the secondary carbon atom is 30% or greater based on the amount of the entire hydroxyl group. Since the reactivity of hydroxyl group bonded to the secondary carbon atom with isocyanate group formed by the dissociation is smaller than the reactivity of hydroxyl group bonded to the primary carbon atom, fluidity of the resin is increased, and the properties of the surface of the polyester having hydroxyl group bonded to the secondary carbon atom can be improved. In particular, when the uretidione compound from bis(isocyanatomethyl)cyclohexane is used as the curing agent, the above effect is remarkably exhibited. The polyester polyol having a fraction of hydroxyl group bonded to the secondary carbon atom of 30% or greater based on the amount of the entire hydroxyl group can be obtained, for example, by condensation of dibasic acids selected from the group consisting of carboxylic acids, such as succinic acid, adipic acid, sebacic acid, dimer acid, maleic anhydride, fumaric anhydride, isophthalic acid and terephthalic acid, used singly or as a mixture of two or more, with polyhydric alcohols selected from the group consisting of polyhydric alcohols such as 1-methyl-ethylene glycol and 1,5-dimethyldiethylene glycol, used singly or as a mixture of two or more.

The acrylic polyol used in the present invention is obtained by copolymerization of a polymerizable monomer having at least one active hydrogen atom in one molecule and monomers copolymerizable with this monomer. Examples of the above polymerizable monomer having at least one active hydrogen atom in one molecule include monomers selected from the group consisting of acrylic esters having active hydrogen atom such as 2-hydroxyethyl acrylate, 2-hydroxypropyl acrylate and 2-hydroxybutyl acrylate; methacrylic esters having active hydrogen atom such as 2-hydroxyethyl methacrylate and 2-hydroxybutyl methacrylate; and polyfunctional (meth)acrylic esters having active hydrogen atom such as acrylic and methacrylic monoesters with glycerol and acrylic and methacrylic monoesters with trimethylolpropane. The above monomers may be used singly or as a mixture of two or more. Further examples of the above acrylic polyol include acrylic polyol resins which are obtained by polymerization of monomers selected from the group consisting of acrylic esters such as methyl acrylate, ethyl acrylate, isopropyl acrylate, n-butyl acrylate and 2-ethylhexyl acrylate, methacrylic esters such as methyl methacrylate, ethyl methacrylate, isopropyl methacrylate, n-butyl methacrylate, isobutyl methacrylate and n-hexyl methacrylate, which are used singly or as a mixture of two or more, in the presence or in the absence of monomers selected from the group consisting of unsaturated carboxylic acids such as acrylic acid, methacrylic acid and itaconic acid, unsaturated amides such as acrylamide, N-methylolacrylamide and diacetoneacrylamide and other polymerizable monomers such as styrene, vinyltoluene, vinyl acetate and acrylonitrile, which are used singly or as a mixture of two or more.

Examples of the fluorinated polyol used in the present invention include fluorinated polyols obtained by copolymerization of a fluoroolefin or a vinyl monomer having fluorine and a vinyl monomer having hydroxyl group as the essential components with copolymerizable vinyl monomers. The polyols described above may be used as a suitable mixture thereof.

The powder coating material composition may further comprise various additives conventionally used in the present technical field such as pigments, coloring matters, levelling agents, agents for preventing crawling, degassing agents, catalysts for NCO/activeH-reaction, photodegradation inhibitors, ultraviolet stabilizers, plasticizers, antioxidants and agents for preventing adverse effects of salts in combination with the main material and the polyaddition composition described above.

Examples of the process for preparation and the process for application of the powder coating material of the present invention will be described in the following. At least one polyol selected from the polyester polyols, the acrylic polyols and the fluorinated polyols and the polyaddition composition are mixed by a Henschel mixer or the like in combination with the additives described above such as pigments. The obtained mixture is melt mixed by a multi-screw extruder, a kneader or the like at a temperature in the range of about 80 to 150° C. After being cooled, the material for the powder coating material thus obtained by the melt mixing is formed into powder having a diameter of about 100 μm or smaller by a crude pulverizer and a fine pulverizer. The typical process for application of the powder coating material is the electrostatic coating using a spray gun. The coating in a fluidized dipping tank, the spray coating, the roll coating or the curtain coating can also be used. Then, the formed coating film is baked under heating at a temperature of 160° C. or higher, and a uniform coating film is formed on a material for coating.

As the above material for coating, metal plates are mainly used. Examples of the metal plate include stainless steel plates, aluminum plates, titanium plates, cold drawn steel plates, zinc-plated steel plates, chromium-plated steel plates, aluminum-plated steel plates and nickel-plated steel plates. Where necessary, the surface of the metal is cleaned with an alkali for defatting and chemically treated for improving adhesion of the coating film. The metal plate may be a shaped metal article formed into a prescribed shape in advance. Where necessary, the surface of the metal may be coated with a primer. It is preferable that the thickness of the primer is 10 μm or smaller.

In the process for producing a precoated metal having the coating film of the present invention, the powder coating material is attached to the surface of the metal plate described above or the shaped metal article formed into a prescribed shape in advance in accordance with a conventional process such as the spray coating, the roll coating, the curtain flow coating and the electrostatic coating. Then, the formed coating film is baked under heating preferably at a temperature of 160° C. or higher, and a uniform coating film is formed. Examples of the material for coating other than the metal plates include concrete products, wood products and plastic products.

To summarize the advantages of the present invention, the powder coating material using the polyaddition composition obtained by using the polyisocyanate compound, which is obtained by converting a bis(isocyanatomethyl)cyclohexane into a uretidione, as the curing agent is advantageous for safety and health due to the absence of dissociation of the blocking agent and for economy due to a greater content of the latent NCO group than conventional uretidione-based powder coating materials. When a curing agent obtained by using the polyisocyanate compound is used in combination with a polyester polyol having 30% or greater of hydroxyl group bonded to the secondary carbon atom in the entire hydroxyl group, the curing temperature is lowered and the obtained coating film has a gloss as excellent as that of solvent-based coating materials and exhibits excellent smoothness of the surface, weatherability and mechanical properties.

EXAMPLES

The present invention will be described more specifically with reference to examples in the following. However, the present invention is not limited to the examples.

The methods of the measurement used in the present invention will be described in the following.

The content of each component in a polyisocyanate compound was obtained from relative areas under peaks which were obtained in accordance with the gel permeation chromatography (GPC) using the apparatus described below.

The content of the uretidione skeleton structure and the content of the isocyanurate skeleton structure in a polyisocyanate compound were obtained using calibration curves which were obtained from intensities of absorptions of the uretidione skeleton structure (1767 $cm^{-1}$) and the isocyanurate skeleton structure (1688 $cm^{-1}$) measured by an infrared spectrometer (FT-IR).

GPC was conducted in the following conditions: the column: one column each of KF-801, 802 and 803 manufactured by SHOWA DENKO Co., Ltd.; the carrier: THF; the method of detection: the differential refractometry; and the treatment of data: SYSTEM 21 created by SYSTEM INSTRUMENT Company. The infrared spectrophotometry was conducted using a Fourier transform infrared spectrophotometer of the FT type manufactured by NIPPON DENSHI Co., Ltd.

The content of the free NCO group in a polyisocyanate compound was obtained by adding an excess amount of di-n-butylamine to react with isocyanate group, followed by back titration of the amount of the unreacted amine with hydrochloric acid and was expressed as % by weight.

The content of the latent NCO group was obtained by treating a polyisocyanate compound by heating at 180° C. for 1 hour and subtracting the content of the free NCO group before the heat treatment from the content of the free NCO group after the heat treatment.

The glass transition temperature of a polyaddition composition was measured using a differential scanning calorimeter (DSC).

The resistance to blocking of a polyaddition composition was obtained as follows: a sample was pulverized by a grinder and passed through an 8 mesh sieve; 15 g of a sample was placed into a test tube having a diameter of 40 mmφ; a load of 20 $g/cm^2$ was applied to the sample; the sample was left standing in this condition at 40° C. for 240 hours; then sample was taken out; and the resistance to blocking of the sample was evaluated as good when the sample returned to the original condition of powder and as poor when the sample showed difficulty in returning to the original condition of powder. The weight-average molecular weight of a polyaddition composition was obtained by the measurement in accordance with the gel permeation chromatography (GPC-RI detector) after being dissolved into tetrahydrofuran.

For the measurements of physical properties of a coating film, an obtained composition of a coating material was pulverized by a hummer mill for pulverization, and the resultant powder was passed through a 100 mesh sieve. The obtained powder was applied to a steel plated treated with zinc phosphate in accordance with the electrostatic coating process, and the obtained coating film was baked at 170° C. for 20 minutes. The smoothness of the surface was expressed as the value of the 20 degree gloss. Erickson value was measured according to JIS K5600-5-2. The impact strength of the coating film was measured according to JIS K5600-5-3 by a impact tester of the Du Pont type and expressed by the maximum height (cm) which did not fracture the surface of the coating film under the condition of 1 kg-½ inchφ.

The weatherability was evaluated using a sunshine weathermeter of the carbon arc light type. The test was conducted at a black standard temperature of 60° C. in the 60 minute cycle including 15 minutes of spraying with water. The 60 degree gloss after 250 hours was divided by the 60 degree gloss before the test, and the result was expressed as the retention of gloss (%).

Preparation Example 1

A polyester polyol having a fraction of hydroxyl group bonded to the secondary carbon atom of 30% or greater was synthesized in accordance with the following procedures. Into a 2,000 ml reactor equipped with a stirrer, a separation column, a thermometer and an inlet tube for a gas, 100 parts by weight of terephthalic acid, 93 parts by weight of neopentyl glycol, 22 parts by weight of glycerol and 0.05 parts by weight of monobutyltin oxide were placed. While the temperature of the reaction was adjusted in a manner such that the temperature of water distilled at the top of the separation column was 100° C. or lower, the reaction was allowed to proceed under the atmosphere of nitrogen at a temperature of 120 to 240° C. and a pressure of 0.1 MPa for 10 hours, and polyester polyol resin (A) was obtained. Polyester polyol resin (A) was analyzed in accordance with $^1$H-NMR. Hydroxyl group bonded to the secondary carbon atom and hydroxyl group bonded to the primary carbon atoms were found, and the fraction of hydroxyl group bonded to the secondary carbon atom was found to be 40% from the ratio of the integral values. Polyester polyol resin (A) had a hydroxyl value of 98 mg KOH/g, an acid value of 9 mg KOH/g, a number-average molecular weight of 2,770 and Tg of 44° C.

Example 1

Into a four-necked flask equipped with a stirrer, a thermometer and a condenser tube, 900 g of 1,3-bis(isocyanatomethyl)cyclohexane (referred to as 1,3-BIC, hereinafter) was placed, and then 1.9 g of tris(dimethylamino) phosphine was added at 25° C. under stirring. The reaction was allowed to proceed at 25° C. When the conversion of 1,3-BIC to a polyisocyanate compound was found to have reached 45% by the analysis of the reaction liquid in accordance with GPC after 28 hours, unreacted 1,3-BIC was removed without deactivation of the catalyst by a thin film evaporation apparatus of the flow type under a vacuum of 1 Torr at a temperature of distillation of 190° C. Obtained polyisocyanate compound a having the uretidione skeleton structure was a slightly yellow clear liquid. The amount of the obtained compound was 317 g. The compound had a viscosity of 3,200 mPa·s (25° C.) and a content of the free NCO group of 19.1% by weight. By the analysis in accordance with GPC and IR, it was found that the content of 1,3-BIC was smaller than 1% by weight, the content of the isocyanurate was smaller than 1% by weight, and the content of the latent NCO group was 20.8% by weight. The isocyanurate fraction did not change after the storage at 25° C. for 3 months.

The reaction of 445 g of 1,3-BIC which was recovered by distillation together with the catalyst was allowed to proceed at 25° C. under stirring for 43 hours, and the conversion of 1,3-BIC to the polyisocyanate compound was 45% as measured in accordance with GPC. Unreacted 1,3-BIC was removed without deactivation of the catalyst by a thin film evaporation apparatus of the flow type under a vacuum of 1 Torr (133 Pa) at a temperature of 190° C. Obtained polyisocyanate compound b having the uretidione skeleton structure was a slightly yellow clear liquid. The amount of the obtained compound was 166 g. The compound had a viscosity of 2,450 mPa·s (25° C.) and a content of NCO group of 19.6% by weight. By the analysis in accordance with GPC and IR, it was found that the content of 1,3-BIC was smaller than 1% by weight, the isocyanurate fraction was smaller than 1% by weight, and the content of the latent NCO group was 20.5% by weight. The isocyanurate fraction did not change after the storage at 25° C. for 3 months.

The reaction of 240 g of 1,3-BIC which was obtained in the second synthesis and recovered by distillation together with the catalyst was allowed to proceed at 25° C. under stirring for 120 hours, and the conversion of 1,3-BIC to the polyisocyanate compound c was 28% as measured in accordance with GPC. It was shown that the synthesis of the uretidione compound from the recovered 1,3-BIC and the catalyst was possible without deactivation of the catalyst.

Example 2

Into a four-necked flask equipped with a stirrer, a thermometer and a condenser tube, 900 g of 1,3-BIC was placed, and then 1.9 g of tris(dimethylamino)phosphine was added at 25° C. under stirring. The reaction was allowed to proceed at 25° C. When the conversion of 1,3-BIC to a polyisocyanate compound was found to have reached 45% by the analysis of the reaction liquid in accordance with GPC after 28 hours, unreacted 1,3-BIC was removed without deactivation of the catalyst by a thin film evaporation apparatus of the flow type under a vacuum of 1 Torr (133 Pa) at a temperature of distillation of 190° C. Obtained polyisocyanate compound d having the uretidione skeleton structure was a slightly yellow clear liquid. The amount of the obtained compound was 317 g. The compound had a viscosity of 3,200 mPa·s (25° C.) and a content of the free NCO group of 19.1% by weight. By the analysis in accordance with GPC and IR, it was found that the content of 1,3-BIC was smaller than 1% by weight, the isocyanurate fraction was smaller than 1% by weight, and the content of the latent NCO group was 20.8% by weight. The isocyanurate fraction did not change after the storage at 25° C. for 3 months.

To 445 g of 1,3-BIC which was recovered by distillation together with the catalyst, 555 g of 1,3-BIC was added, and 0.8 g of tris(dimethylamino)phosphine was then added. The reaction of the resultant mixture was allowed to proceed at 25° C. under stirring for 43 hours. The conversion of 1,3-BIC to the polyisocyanate compound was 45% as measured in accordance with GPC. Obtained polyisocyanate compound e having the uretidione skeleton structure was a slightly yellow clear liquid. The amount of the obtained compound was 317 g. The compound had a viscosity of 3,200 mPa·s (25° C.) and a content of the free NCO group of 19.16% by weight. By the analysis in accordance with GPC and IR, it was found that the content of 1,3-BIC was smaller than 1% by weight, the isocyanurate fraction was smaller than 1% by weight, and the content of the latent NCO group was 20.8% by weight. The isocyanurate fraction did not change after the storage at 25° C. for 3 months.

Comparative Example 1

Into a four-necked flask equipped with a stirrer, a thermometer and a condenser tube, 1,020 g of IPDI was placed, and then 2.1 g of tris(dimethylamino)phosphine was added at 25° C. under stirring. The reaction was allowed to proceed at 25° C. When the conversion of IPDI to a polyisocyanate compound was found to have reached 33% by the analysis of the reaction liquid in accordance with GPC after 93 hours, unreacted IPDI was removed without deactivation of the catalyst by a thin film evaporation apparatus of the flow type under a vacuum of 1 Torr (133 Pa) at a temperature of distillation of 190° C. Obtained polyisocyanate compound f having the uretidione skeleton structure was a slightly yellow clear liquid. The amount of the obtained compound was 261 g. The compound had a viscosity of 100,000 mPa·s or greater (25° C.) and a content of the free NCO group of 18% by weight. By the analysis in accordance with GPC and IR, it was found that the content of 1,3-BIC was smaller than 1% by weight, the isocyanurate fraction was smaller than 1% by weight, and the content of the latent NCO group was 16% by weight. The isocyanurate fraction did not change after the storage at 25° C. for 3 months. When IPDI was used, the viscosity was great and the content of the free NCO group was small.

Comparative Example 2

Into a four-necked flask equipped with a stirrer, a thermometer and a condenser tube, 1,009 g of HDI was placed, and then 5.0 g of tris(dimethylamino)phosphine was added at 25° C. under stirring. The reaction was allowed to proceed at 25° C. When the conversion of HDI to a polyisocyanate compound was found to have reached 41% by the analysis of the reaction liquid in accordance with GPC after 41 hours, unreacted HDI was removed without deactivation of the catalyst by a thin film evaporation apparatus of the flow type under a vacuum of 1 Torr (133 Pa) at a temperature of distillation of 190° C. Obtained polyisocyanate compound g having the uretidione skeleton structure was a slightly yellow clear liquid. The amount of the obtained compound was 294 g. The compound had a viscosity of 35 mPa·s (25° C.) or greater and a content of the free NCO group of 23% by weight. By the analysis in accordance with GPC and IR, it was found that the content of HDI was smaller than 1% by weight, the isocyanurate fraction was smaller than 1% by weight, and the content of the latent NCO group was 20% by weight. The isocyanurate fraction did not change after the storage at 25° C. for 3 months.

Example 3

Polyisocyanate compound a having the uretidione skeleton structure which was obtained in Example 1 in an amount of 41 g (0.20 eq) was placed into a kneader. While the rotation speed was kept at 130 rpm and the temperature was kept at 130° C., 7.8 g (0.174 eq) of 1,4-butanediol and 4.0 g (0.031 eq) of 2-ethylhexanol were added so that the ratio of the amount by mole of OH group to the amount by mole of NCO group (OH/NCO) was set at 1.05, and 0.06 g of dibutyltin dilaurate was added as the catalyst for the formation of urethane. After the resultant mixture was kept being stirred for 10 minutes in this condition, the temperature was lowered, and the formed polymer was taken out and cooled to the room temperature. Obtained polyaddition composition A had a weight-average molecular weight of 15,000 and a glass transition temperature of 60° C. As shown in Table 1, the composition had a small melt viscosity and a great content of the latent NCO group and exhibited excellent resistance to blocking.

Example 4

Polyisocyanate compound a having the uretidione skeleton structure which was obtained in Example 1 in an amount of 41 g (0.20 eq) was placed into a kneader. While the rotation speed was kept at 130 rpm and the temperature was kept at 130° C., 12.5 g (0.174 eq) of 1,4-bis(hydroxymethyl)cyclohexane and 4.0 g (0.031 eq) of 2-ethylhexanol were added so that the ratio of the amount by equivalent of active hydrogen atom to the amount by equivalent of NCO group (active H/NCO) was set at 1.05, and 0.06 g of dibutyltin dilaurate was added as the catalyst for formation of urethane. After the resultant mixture was kept being stirred for 10 minutes in this condition, the temperature was lowered, and the formed polymer was taken out and cooled to the room temperature. Obtained polyaddition composition B had a weight-average molecular weight of 13,000 and a glass transition temperature of 52° C. As shown in Table 1, the composition had a small melt viscosity and a great content of the latent NCO group and exhibited excellent resistance to blocking.

Comparative Example 3

Polyisocyanate compound f having the uretidione skeleton structure which was obtained in Comparative Example 1 in an amount of 41 g (0.20 eq) was placed into a kneader. While the rotation speed was kept at 130 rpm and the temperature was kept at 130° C., 7.8 g (0.174 eq) of 1,4-butanediol and 4.0 g (0.031 eq) of 2-ethylhexanol were added so that the ratio of the amount by equivalent of active hydrogen atom to the amount by equivalent of NCO group (active H/NCO) was set at 1.05, and 0.06 g of dibutyltin dilaurate was added as the catalyst for formation of urethane. After the resultant mixture was kept being stirred for 10 minutes in this condition, the temperature was lowered, and the formed polymer was taken out and cooled to the room temperature. Obtained polyaddition composition C had a weight-average molecular weight of 7,000 and a glass transition temperature of 90° C. As shown in Table 1, the composition had a great melt viscosity and a small content of the latent NCO group although the composition exhibited excellent resistance to blocking.

Comparative Example 4

Polyisocyanate compound g having the uretidione skeleton structure which was obtained in Comparative Example 2 in an amount of 41 g (0.20 eq) was placed into a kneader. While the rotation speed was kept at 130 rpm and the temperature was kept at 130° C., 7.8 g (0.174 eq) of 1,4-butanediol and 4.0 g (0.031 eq) of 2-ethylhexanol were added so that the ratio of the amount by mole of OH group to the amount by mole of NCO group (OH/NCO) was set at 1.05, and 0.06 g of dibutyltin dilaurate was added as the catalyst for formation of urethane. After the resultant mixture was kept being stirred for 10 minutes in this condition, the temperature was lowered, and the formed polymer was taken out and cooled to the room temperature. The polymer was not solidified and remained in the agar-like form. When HDI was used, the product was not solidified and had a glass transition temperature of 10° C. The composition exhibited poor resistance to blocking, and could not be used as the curing agent of the powder coating material.

TABLE 1

|  | Melt viscosity (mPa · s/130° C.) | Content of latent NCO group (% by weight) | Resistance to blocking |
|---|---|---|---|
| Example 3 | 260 | 19 | good |
| Example 4 | 690 | 17 | good |
| Comparative Example 3 | 6,000 | 13 | good |

Example 5

To 150 parts by weight of polyester polyol resin (A) obtained in Preparation Example 1, 11.8 parts by weight of polyaddition composition A obtained in Example 3, 50 parts by weight of titanium oxide, 1.0 part by weight of MODA-FLOW 2000 (an agent for acceleration of flow manufactured by MONSANTO Company), 0.5 parts by weight of BENZOINJI (an agent for preventing formation of pin holes manufactured by WAKO JUN-YAKU Co., Ltd.) and 0.5 parts by weight of butyltin dilaurate were added. The resultant mixture was mixed by a Henschel mixer and then melt mixed by a twin-screw extruder at 100° C. The extruded melted mixture was cooled by pinch rollers at 10° C., and a powder coating material was obtained. The obtained powder coating material was pulverized by a crude pulverizer and a fine pulverizer and passed through a 100 mesh sieve. The obtained powder coating material was applied to a steel plate treated with zinc phosphate by an electrostatic coating machine of the spray gun type, and the physical properties of the coating film formed after baking were measured. The results are shown in Table 2. The coating film had a 20 degree gloss of 90 which was as excellent as that obtained with solvent-based coating materials.

Comparative Example 5

To 140 parts by weight of polyol polyester resin (A) obtained in Preparation Example 1, 15.5 parts by weight of polyaddition composition C obtained in Comparative Example 3, 50 parts by weight of titanium oxide, 1.0 part by weight of MODAFLOW 2000, 0.5 parts by weight of BENZOINJI and 0.5 parts by weight of butyltin dilaurate were added. The resultant mixture was mixed by a Henschel mixer and then melt mixed by a twin-screw extruder at 100° C. The extruded melted mixture was cooled by pinch rollers at 10° C., and a powder coating material was obtained. The obtained powder coating material was pulverized by a crude pulverizer and a fine pulverizer and passed through a 100 mesh sieve. The obtained powder coating material was applied to a steel plate treated with zinc phosphate by an electrostatic coating machine of the spray gun type, and the physical properties of the coating film formed after baking were measured. The results are shown in Table 2. No smell of blocking agents was found during the baking, and the coating film exhibited poor physical properties.

TABLE 2

| | Properties of coating film after curing at 180° C. for 20 minutes | | |
|---|---|---|---|
| Curing agent | 20 degree gloss (%) | Erickson value (mm) | Du Pont impact resistance (cm) |
| Example 5 | 90 | 7 | 40 |
| Comparative Example 5 | 65 | 1 | 30 |

Example 6

To 88.2 parts by weight of a polyester polyol having a hydroxyl value of 53 mg KOH/g and a glass transition temperature of 59° C., 11.8 parts by weight of polyaddition composition A obtained in Example 3, 50 parts by weight of titanium oxide, 1.0 part by weight of MODAFLOW 2000 (an agent for acceleration of flow manufactured by MONSANTO Company), 0.5 parts by weight of BENZOINJI (an agent for preventing formation of pin holes manufactured by WAKO JUN-YAKU Co., Ltd.) and 0.5 parts by weight of butyltin dilaurate were added. The resultant mixture was mixed by a Henschel mixer and then melt mixed by a twin-screw extruder at 100° C. The extruded melted mixture was cooled by pinch rollers at 10° C., and a powder coating material was obtained. The obtained powder coating material was pulverized by a crude pulverizer and a fine pulverizer and passed through a 100 mesh sieve. The obtained powder coating material was applied to a steel plate treated with zinc phosphate by an electrostatic coating machine of the spray gun type, and the physical properties of the coating film formed after baking were measured. The results are shown in Table 3. No smell of blocking agents was found during the baking, and the coating film exhibited excellent physical properties.

Example 7

To 87.2 parts by weight of a polyester polyol having a hydroxyl value of 53 mg KOH/g and a glass transition temperature of 59° C., 12.7 parts by weight of polyaddition composition B obtained in Example 4, 50 parts by weight of titanium oxide, 1.0 part by weight of MODAFLOW 2000, 0.5 parts by weight of BENZOINJI and 0.5 parts by weight of butyltin dilaurate were added. The resultant mixture was mixed by a Henschel mixer and then melt mixed by a twin-screw extruder at 100° C. The extruded melted mixture was cooled by pinch rollers at 10° C., and a powder coating material was obtained. The obtained powder coating material was pulverized by a crude pulverizer and a fine pulverizer and passed through a 100 mesh sieve. The obtained powder coating material was applied to a steel plate treated with zinc phosphate by an electrostatic coating machine of the spray gun type, and the physical properties of the coating film formed after baking were measured. The results are shown in Table 3. No smell of blocking agents was found during the baking, and the coating film exhibited excellent physical properties.

Comparative Example 6

To 84.5 parts by weight of a polyester polyol having a hydroxyl value of 53 mg KOH/g and a glass transition temperature of 59° C., 15.5 parts by weight of polyaddition composition C obtained in Comparative Example 3, 50 parts by weight of titanium oxide, 1.0 part by weight of MODA-FLOW 2000, 0.5 parts by weight of BENZOINJI and 0.5 parts by weight of butyltin dilaurate were added. The resultant mixture was mixed by a Henschel mixer and then melt mixed by a twin-screw extruder at 100° C. The extruded melted mixture was cooled by pinch rollers at 10° C., and a powder coating material was obtained. The obtained powder coating material was pulverized by a crude pulverizer and a fine pulverizer and passed through a 100 mesh sieve. The obtained powder coating material was applied to a steel plate treated with zinc phosphate by an electrostatic coating machine of the spray gun type, and the physical properties of the coating film formed after baking were measured. The results are shown in Table 3. No smell of blocking agents was found during the baking, and the coating film exhibited poor physical properties.

TABLE 3-1

| | Properties of coating film after curing at 170° C. for 20 minutes | | |
| --- | --- | --- | --- |
| Curing agent | 20 degree gloss (%) | Erickson value (mm) | Du Pont impact resistance (cm) |
| Example 6 | 80 | 7< | 30 |
| Example 7 | 81 | 7< | 50 |
| Comparative Example 6 | 78 | <1 | <10 |

TABLE 3-2

| | Properties of coating film after test in boiling water for 1 hour | | |
| --- | --- | --- | --- |
| | Erickson value (mm) | Du Pont impact resistance (kg · cm) | Weatherability test (retention of gloss) 60 degree gloss(%) |
| Example 6 | 7< | 30 | 82 |
| Example 7 | 7< | 10 | 83 |
| Comparative Example 6 | <4 | <10 | 80 |

The invention claimed is:

1. A powder coating material which comprises a main material including a polyester polyol having a fraction of hydroxyl group bonded to secondary carbon atom of 30% or greater based on an amount of an entire hydroxyl group, and a curing agent comprising a polyisocyanate polyaddition composition which is obtained by reacting (A) a polyisocyanate compound obtained by converting a bis(isocyanatomethyl)cyclohexane into a uretidione compound, the polyisocyanate compound having a content of a latent NCO group [(a content of free NCO group after a heat treatment at 180° C. for 1 hour)−(a content of free NCO group before the heat treatment)] of 16 to 30% by weight and an isocyanurate fraction [a content of an isocyanurate skeleton structure× 100/(a content of an isocyanurate skeleton structure+a content of a uretidione structure)] smaller than 5% by weight, and (B) a compound having active hydrogen atom which comprises a combination of (a) a compound having at least two active hydrogen atoms in one molecule and (b) a compound having one active hydrogen atom in one molecule in amounts such that a ratio of an amount by equivalent of active hydrogen atom in component (a) to an amount by equivalent of active hydrogen atom in component (b) is in a range of 1 to 99, wherein the reaction of component (A) and (B) is conducted in a manner such that a ratio of an amount by equivalent of active hydrogen atom in component (B) to an amount by equivalent of isocyanate group in component (A) (a ratio of amounts by equivalent of active hydrogen atom/isocyanate group) is in a range of 1.0 to 2.0.

2. A powder coating material which comprises a main material including a polyester polyol having a fraction of hydroxyl group bonded to secondary carbon atom of 30% or greater based on an amount of an entire hydroxyl group, and a curing agent comprising a polyisocyanate polyaddition composition which is obtained by reacting (A) a polyisocyanate compound obtained by converting a bis(isocyanatomethyl)cyclohexane into a uretidione compound, the polyisocyanate compound having a content of a latent NCO group [(a content of free NCO group after a heat treatment at 180° C. for 1 hour)−(a content of free NCO group before the heat treatment)] of 16 to 30% by weight and an isocyanurate fraction [a content of an isocyanurate skeleton structure× 100/(a content of an isocyanurate skeleton structure+a content of a uretidione structure)] smaller than 5% by weight, and (B) a compound having active hydrogen atom which comprises a combination of (a) a compound having at least two active hydrogen atoms in one molecule and (b) a compound having one active hydrogen atom in one molecule in amounts such that a ratio of an amount by equivalent of active hydrogen atom in component (a) to an amount by equivalent of active hydrogen atom in component (b) is in a range of 1 to 99, wherein the reaction of component (A) and (B) is conducted in a manner such that a ratio of an amount by equivalent of active hydrogen atom in component (B) to an amount by equivalent of isocyanate group in component (A) (a ratio of amounts by equivalent of active hydrogen atom/isocyanate group) is in a range of 1.0 to 2.0, wherein the compound having at least two active hydrogen atoms in one molecule (a) is at least one compound selected from aliphatic, alicyclic and aromatic diols and diamines, and the compound having one active hydrogen atom in one molecule of component (b) is at least one compound selected from aliphatic, alicyclic and aromatic monools, monoamines, lactams and oximes.

3. A powder coating material according to claim 1, wherein the compound having at least two active hydrogen atoms in one molecule of component (a) is at least one compound selected from aliphatic, alicyclic and aromatic diols and diamines.

4. A powder coating material according to claim 1, wherein the compound having one active hydrogen atom in one molecule of component (b) is at least one compound selected from aliphatic, alicyclic and aromatic monools, monoamines, lactams and oximes.

* * * * *